United States Patent [19]

Lal et al.

[11] Patent Number: 4,551,503

[45] Date of Patent: * Nov. 5, 1985

[54] PREPARATION OF INTERPOLYMERS OF ALPHA-OLEFINS AND NONCONJUGATED ALPHA, OMEGA-DIENES

[75] Inventors: Joginder Lal, Akron; Michael L. Senyek, Tallmadge, both of Ohio

[73] Assignee: The Goodyear Tire & Rubber Company, Akron, Ohio

[ * ] Notice: The portion of the term of this patent subsequent to Jul. 20, 1999 has been disclaimed.

[21] Appl. No.: 342,261

[22] Filed: Jan. 25, 1982

Related U.S. Application Data

[63] Continuation-in-part of Ser. No. 861,600, Dec. 19, 1977, Pat. No. 4,340,705, which is a continuation-in-part of Ser. No. 694,851, Jun. 10, 1976, abandoned.

[51] Int. Cl.[4] ............................................. C08F 236/20
[52] U.S. Cl. .................................. 525/332.1; 526/139; 526/336
[58] Field of Search ............................ 525/333, 332.1; 526/139, 336

[56] References Cited

U.S. PATENT DOCUMENTS

| | | | |
|---|---|---|---|
| 2,933,480 | 4/1960 | Gresham et al. | 526/336 |
| 3,574,176 | 4/1971 | Boozer | 526/141 |
| 3,595,842 | 7/1971 | Schrage et al. | 526/142 |
| 3,746,694 | 7/1973 | Cluff | 526/336 |
| 3,900,452 | 8/1975 | Valvassori et al. | 526/336 |
| 3,933,769 | 1/1976 | Lal et al. | 526/336 |
| 3,975,336 | 8/1976 | Lal et al. | 526/139 |
| 4,020,250 | 4/1977 | Lal | 525/333 |

FOREIGN PATENT DOCUMENTS

| | | | |
|---|---|---|---|
| 836790 | 6/1960 | United Kingdom | 526/336 |
| 1089333 | 11/1967 | United Kingdom | 526/336 |

*Primary Examiner*—Edward J. Smith
*Attorney, Agent, or Firm*—J. D. Wolfe; Alvin T. Rockhill

[57] ABSTRACT

Interpolymers of alpha-olefins and nonconjugated alpha,omega-dienes are prepared by organoaluminum compound-transition metal compound catalysts modified with hexaalkylphosphoric triamides or organophosphate esters.

7 Claims, No Drawings

PREPARATION OF INTERPOLYMERS OF ALPHA-OLEFINS AND NONCONJUGATED ALPHA, OMEGA-DIENES

This application is a continuation-in-part application of Ser. No. 861,600 filed Dec. 19, 1977, now U.S. Pat. No. 4,340,705, which was a continuation-in-part of application Ser. No. 694,851, filed June 10, 1976, abandoned.

TECHNICAL FIELD

This invention relates to an improved polymerization process and more particularly to the preparation of interpolymers of α-olefins with nonconjugated α,ω-dienes in the presence of coordination catalysts modified with hexaalkylphosphoric triamides or organophosphate esters.

BACKGROUND OF THE INVENTION

In the preparation of interpolymers of α-olefins and nonconjugated dienes, the prior art such as, U.S. Pat. No. 2,933,480 teaches that with α,ω-dienes such as 1,7-octadiene in which all the unsaturation is terminal, both double bonds of the diolefin tend to be used up in the copolymerization with monoolefins, thus reducing the residual unsaturation which is required for good curing properties. In U.S. Pat. No. 3,900,452 aliphatic polyenes containing at least three double bonds are utilized to prepare interpolymers because an aliphatic diene can contribute to formation of saturated rings which constitute inert sites in the main chain and cannot be utilized in sulfur vulcanization. In U.S. Pat. No. 3,933,769, interpolymers prepared with 1,7-octadiene are shown to exhibit lower inherent viscosity, higher gel, and considerably lower tensile strength than the corresponding polymers prepared with the special non-α,ω-monomer mixture of 4- and 5-methyl-1,4-hexadienes.

C. S. Marvel and W. E. Garrison, Jr. have reported the homopolymerization of α,ω-diolefins of the general formula: $CH_2=CH-(CH_2)_n-CH=CH_2$ where $n=4$ to 12, 14, 18, with a triisobutylaluminum-titanium tetrachloride catalyst [*J. Amer. Chem. Soc.*, 81, 4737 (1959)]. The polymerization of these α,ω-dienes yields low molecular weight polymers made up of soluble and insoluble, crosslinked portions. The soluble polymers possessed a very low molecular weight as evidenced by their sticky nature, semi-solid appearance and low inherent viscosities of the order of 0.1 dl/g. Also, the total unsaturation of the soluble polymers was considerably less than one double bond per monomer unit, indicating that cyclization had occurred.

Thus, the prior art illustrates the difficulties in preparing readily-sulfur-curable, linear interpolymers of α-olefins and α,ω-dienes, which preferably contain at least one double bond per α,ω-diene monomer unit.

We have discovered that high molecular weight, high inherent viscosity, low gel, i.e., zero to about 5 percent gel, improved-unsaturation interpolymers of α-olefins and α,ω-diolefins containing at least 8 carbon atoms can be prepared by modification of the organoaluminum compound-transition metal compound catalyst systems with hexa(hydrocarbyl)phosphoric triamides or organophosphate esters. These interpolymers are quite different from those of the prior art as attested by their improved vulcanizate properties such as tensile strength, crosslink density, and swelling resistance to solvents. These interpolymers contain residual terminal olefinic double bonds which are present in pendant groups of the polymer chain and are derived from α,ω-dienes. The structure of a repeating unit from an α,ω-diene may be represented as:

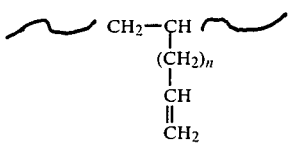

where $n=4$ to about 30. These olefinic double bonds are readily available as curing sites for sulfur vulcanization, resulting in the attainment of improved vulcanizate properties.

It was further found that hexaalkylphosphoric triamides and organophosphate esters will modify the organoaluminum-transition metal catalyst to give interpolymers of improved unsaturation and 0 to about 5 percent gel, which give improved vulcanizate properties. Other catalyst modifiers such as amines and phosphites do not yield interpolymers with the desired 0 to 5 percent gel and with improved unsaturation.

The data in Table I and the Examples disclosed herein illustrate the novelty of the instant invention over U.S. Pat. No. 3,933,769. This Table shows how 1,7-octadiene/1-hexene interpolymers using the modified organoaluminum-titanium trichloride catalyst give higher inherent viscosities, indicating higher molecular weight polymers, with 0 to few percent gel, compared with the corresponding 1,7-octadiene interpolymers prepared with $Et_3Al/VCl_4/TiCl_4$ catalyst suspension over a broad range of 1,7-octadiene charge of 5–25 mole percent based on total monomers. Some of the data on these aspects are summarized in Table I. These data are selected from the various Examples in the Experimental part of the instant invention. The range of inherent viscosity data shown in Table I for the same molar charge ratio of 1-hexene to 1,7-octadiene for the interpolymers of the present invention is related to such factors as the type and amount of catalyst modifier and type and amount of the organoaluminum compound.

Table I, Example XIII, illustrate the improved vulcanizate stress-strain properties resulting from the use of the modified organoaluminum-titanium trichloride catalyst for preparation of interpolymers of the instant invention compared to interpolymers prepared with the $Et_3Al/VCl_4/TiCl_4$ catalyst, Example (b). These improved properties result because the interpolymers of the instant invention are gel-free and possess improved unsaturation for subsequent vulcanization.

TABLE I

Influence of Polymerization Catalyst on Inherent Viscosity and Gel Content of the Interpolymers Derived from 1,7-Octadiene and Stress-Strain Properties of Vulcanizates.

| | | | | Polymer | | | Vulcanizate | | |
|---|---|---|---|---|---|---|---|---|---|
| Example | Catalyst[a] | Diene | Mole % Charged | Inherent Viscosity | % Gel | Curing Min/°F. | Tensile Strength, psi | Elongation at Break,% | 300% Modulus, psi |
| [b] | B | 1,7-octadiene | 3 | 4.4 | 3.6 | 35/310 | 1850 | 515 | 970 |
| [b] | " | " | 10 | 3.3 | 21.0 | 15/290 | 1510 | 415 | 1070 |
| XIII | C | " | 5 | 5.1 | 0 | 15/310 | 2340 | 505 | 1180 |
| XIII | D | " | 5 | 5.0 | 0 | 15/310 | 2170 | 470 | 1290 |
| I | E | " | 5 | 6.6 | 0 | ND[c] | ND | ND | ND |
| XIII | C | " | 10 | 3.5 | 0 | 15/310 | 2200 | 510 | 1150 |
| V | F | " | 10 | 4.1 | 0 | ND | ND | ND | ND |
| VI | C | " | 25 | 3.6 | 3 | ND | ND | ND | ND |

[a]Catalyst B: Et₃Al/VCl₄/TiCl₄. Ti/V = 3. Al/(Ti + V) = 2.5.
Catalyst C: Et₂AlCl/δ-TiCl₃/[(CH₃)₂N]₃PO. Al/Ti = 1.5. P/Al = 0.7.
Catalyst D: Et₂AlCl/δ-TiCl₃/(n-B₄O)₃PO. Al/Ti = 1.5. P/Al = 0.7.
Catalyst E: Et₂AlCl/δ-TiCl₃/[(CH₃)₂N]₃PO. Al/Ti = 1.5. P/Al = 0.2.
Catalyst F: EtAlCl₂/δ-TiCl₃/[(CH₃)₂N]₃PO. Al/Ti = 1.5. P/Al = 0.7.
[b]Data from Table II of U.S. Pat. No. 3,933,769.
[c]Not Determined.

These interpolymers are formed in high conversion and also exhibit high molecular weights. Also, the interpolymers possess sufficient unsaturation to be readily sulfur-cured and have a gel content of 0 to less than 5 percent. Due to this low gel content, they are suitable for fabricating or molding goods. These interpolymers are rubbery or leathery in nature, depending on their composition. However, rubbery polymers are preferred. They are also highly ozone-resistant.

This invention is directed to sulfur vulcanizable unsaturated interpolymers of at least one terminally unsaturated monoolefin, wherein the monoolefin contains from 4 carbon atoms to about 12 carbon atoms with nonconjugated $\alpha,\omega$-dienes containing 8 to about 36 carbon atoms, wherein the said monoolefin comprises from about 95 to about 75 mole percent of the total monomers charged. Thus, the interpolymers of the present invention are prepared from about 5 to about 25 mole percent of charged $\alpha,\omega$-dienes and from about 95 to about 25 mole percent monoolefin.

Thus, the present invention is directed to the preparation of improved sulfur vulcanizable unsaturated interpolymers of at least one terminally unsaturated linear or branched monoolefin with a nonconjugated diene which is an $\alpha,\omega$-diene, thus indicating that interpolymers with one or more $\alpha,\omega$-dienes may be prepared in accordance with the practice of this invention, and said terminally unsaturated monoolefin comprises from about 95 to about 75 mole percent of the total monomer charged.

Illustrative examples of the terminally unsaturated monoolefins are: 1-butene, 1-pentene, 1-hexene, 1-heptene, 4-methyl-1-pentene, 4-methyl-1-hexene, 5-methyl-1-hexene, 1-octene, 1-decene, 1-undecene, 1-dodecene and the like. The linear monoolefins are preferred.

Illustrative examples of suitable $\alpha,\omega$-dienes containing at least 8 carbon atoms are 1,7-octadiene, 1,8-nonadiene, 1,9-decadiene, 1,10-undecadiene, 1,11-dodecadiene, 1,12-tridecadiene, 1,13-tetradecadiene, and the like.

The improved polymerization process of the present invention may be accomplished by the use of a catalytic mixture containing (A) at least one organoaluminum compound having the formula $RAlX_2$, $R_3Al_2X_3$, $R_2AlX$, or $R_3Al$ wherein R is a hydrocarbon radical containing 1 to 12 carbon atoms and selected from the group of alkyl and/or aryl radicals and X is a halide selected from the group consisting of chloride, bromide, iodide radicals, (B) at least one compound or salt of a transition metal of Group IVB of the Periodic Table, and (C) at least one compound having the general formula: $Q=P(XY_n)_3$, wherein Q is oxygen or sulfur, P is phosphorous, Y is a hydrocarbyl radical containing from 1 to 20 carbon atoms, X is oxygen, sulfur or nitrogen and n is an integer having values of 1 or 2, with the proviso that when X is oxygen or sulfur, then n is 1 and when X is nitrogen, then n is 2, as exemplified by the generic class of hexahydrocarbyl phosphoric triamides. Examples of these Y or hydrocarbyl radicals are alkyl, alkenyl, aralkyl, aryl, alkaryl and cycloalkyl radicals containing 1 to 20 carbon atoms and preferably 1 to 10 carbon atoms.

The preferred organoaluminum compounds, i.e. Component A, are the lower alkyl derivatives and the most preferred are ethylaluminum dichloride, diethylaluminum chloride, ethylaluminum sesquihalide, triethylaluminum and triisobutylaluminum.

The preferred transition metals of Component B are titanium or zirconium. The compounds of transition metals are preferably halides, oxyhalides, alkoxides and acetylacetonates. Titanium trichloride is preferred. Any crystallographic form of titanium trichloride may be used such as $\alpha$, $\beta$, $\gamma$, or $\delta$-titanium trichloride. Catalysts derived from titanium tetrachloride may be preformed or prepared in situ.

Preferred compounds for Component C are hexaalkylphosphoric triamides or organophosphate esters. Among the specific compounds that can be used are hexamethylphosphoric triamide, triethyl trimethylphosphoric triamide, trimethyl tripropylphosphoric triamide, hexamethylthiophosphoric triamide, hexaethylthiophosphoric triamide, tri-n-butyl phosphate, triallyl phosphate, trimethyl phosphate, triethyl phosphate, O,O,O-triethylphosphorothioate, O,O,O-tri-n-butylphosphorothioate, O,O,O-trimethylphosphorothioate, trimethylphosphorotetrathioate, triethylphosphorotetrathioate, S,S,S-trimethylphosphorotrithioate, S,S,S-triethylphosphorotrithioate, O,S,S-triethylphosphorotrithioate, and the like.

Ordinarily, the transition metal compound useful in forming the catalyst is employed in an amount such as to provide about 0.0002 to 0.01, preferably about 0.0001 to 0.008 mole of transition metal compound per mole of monomers being polymerized. The organoaluminum compound is usually employed in an amount so as to provide an organoaluminum compound/transition metal compound molar ratio of about 0.5 to 15, preferably about 0.75 to 5, most preferably about 1.0 to 4.0. The Component C is usually employed in an amount so as to provide a Component C/organoaluminum compound molar ratio of about 0.1 to 2, preferably 0.2 to 1.5.

The amount of catalyst by weight is from about 0.1 to about 10 phm (parts per hundred of monomers), the preferred range being about 0.5 to 5 phm.

The polymerization can be conducted in an inert solvent. By "inert solvent" is meant one that will not adversely affect the reaction rate or reaction product. Suitable solvents are aliphatic, aromatic or cycloaliphatic hydrocarbons. Representatives of such solvents are heptane, hexane, pentane, benzene, toluene, cyclopentane, cyclohexane and the like. Chlorinated hydrocarbons such as trichloroethylene, tetrachloroethylene and chlorobenzene may be used.

The polymerization reactions involved in this invention can be carried out over a wide range of temperatures. It is convenient to carry out the process at temperatures of −20° C. to 100° C., preferably 0° C. to 50° C. The reactions may be carried out at atmospheric pressure, subatmospheric pressure, or superatmospheric pressure.

EXPERIMENTAL

The titanium trichloride was obtained commercially from Stauffer Chemical Co. and designated as titanium trichloride AA, hereafter referred to as δ-titanium trichloride.

An illustrative catalyst system suitable for the polymerization reaction consisted of δ-titanium trichloride-diethylaluminum chloride ($\delta$-TiCl$_3$-Et$_2$AlCl), δ-titanium trichloride-triethylaluminum, ($\delta$-TiCl$_3$-Et$_3$Al), or δ-titanium trichloride-triisobutylaluminum [$\delta$-TiCl$_3$(i-Bu)$_3$Al]. The δ-TiCl$_3$ complex used contained 0.33 mole of aluminum trichloride per mole of δ-TiCl$_3$. The preferred order of addition of components was: Component A, Component C, Component B.

Unless otherwise stated, all polymerization reactions were conducted in bottles in a nitrogen atmosphere. The bottles were tumbled end-on-end in a polymerization bath kept at a constant temperature. The polymerization mixture was precipitated in excess methanol or isopropyl alcohol containing 0.1 percent 2,6-di-tert-butyl-p-cresol, as a stabilizer, followed by drying under reduced pressure.

As employed in this specification, inherent viscosity is defined as the natural logarithm of the relative viscosity at 30° C. divided by the polymer concentration for an 0.05 to 0.10 percent (w./v.) solution in toluene, chloroform, or tetrachloroethylene and expressed in units of deciliters per gram (dl/g).

Percent insolubility of vulcanizates in toluene was determined at 25° C. after immersion in toluene for 72 hours by placing one gram of sample in 200 milliliters (ml) of toluene. The toluene solvent was changed after 24, 48 and 72 hours. The swollen sample was weighed and subsequently dried under vacuum to determine the weight of insoluble gel. From the same measurement, swelling ratio, Q, of the gel fraction was calculated as the ratio of the weight of the toluene-insoluble gel. The percent insolubility and swelling ratio were corrected for the amount of filler present in a vulcanizate.

The practice of this invention is illustrated by reference to the following examples which are intended to be representative rather than restrictive of its scope.

EXAMPLE I

A solution containing 54 grams (0.64 mole) 1-hexene, 3.8 grams (0.034 mole) 1,7-octadiene, and 80 ml. pentane was sparged with nitrogen in a eight-ounce bottle. The molar charge ratio of 1-hexene to 1,7-octadiene was 95:5. To the solution, the required amount of Et$_2$AlCl, hexamethylphosphorictriamide, and 1.0 millimole δ-titanium trichloride were added in the order indicated. The molar ratio of Et$_2$AlCl to δ-TiCl$_3$ was 1.5:1, and the molar ratio of hexamethylphosphoric triamide to Et$_2$AlCl was 0.2:1. The copolymerization was allowed to proceed for 24 hours at 25° C. The resulting copolymer was isolated by precipitation in excess methanol (79 percent conversion). The copolymer had inherent viscosity of 6.6 (toluene solvent) and contained no gel. The copolymer from a control bottle prepared similarly but without hexamethylphosphoric triamide added to the Et$_2$AlCl-δ-TiCl$_3$ catalyst had an inherent viscosity of 3.5 and 25 percent gel content measured in toluene. These data demonstrate that modification of the polymerization catalyst with hexamethylphosphoric triamide led to the formation of a higher molecular weight, gel-free copolymer of 1-hexene and 1,7-octadiene.

EXAMPLE II

A premix of 55.4 grams (0.986 mole) 1-butene, 48.6 grams (0.578 mole) 1-hexene, and 9.06 grams (0.082 mole) 1,7-octadiene (molar charge ratio 60:35:5) in 450 grams benzene was polymerized with Et$_2$AlCl/hexamethylphosphoric triamide/δ-TiCl$_3$ catalyst (4.0 millimoles δ-TiCl$_3$) at 25° C. for 72 hours. The molar ratio of Et$_2$AlCl to TiCl$_3$ was 1.5:1 and of the phosphoric triamide to Et$_2$AlCl was 0.2:1. The conversion to terpolymer was 82 percent. It had an inherent viscosity of 5.5, and contained no gel as measured in chloroform. A terpolymer prepared similarly, but without hexamethylphosphoric triamide was obtained in 84 percent conversion. It had an inherent viscosity of 3.2 and 23 percent gel content as measured in chloroform.

The rubbery polymers were compounded with the following recipe, on a weight basis:

| Ingredients | Parts |
| --- | --- |
| Rubber | 100 |
| ISAF carbon black | 50 |
| Zinc oxide | 5 |
| Stearic acid | 2 |
| Sulfur | 2 |
| 2-Mercaptobenzothiazole | 0.5 |
| Tetramethylthiuram disulfide | 1 |

Vulcanizates were prepared by curing the compounded rubbers in a press for 20 minutes at 310° F. Some properties of the vulcanizates are given below:

|  | Terpolymer prepared with hexamethylphosphoric triamide modification | Terpolymer prepared without modification (Control) |
| --- | --- | --- |
| Tensile Strength, psi | 2770 | 2210 |
| Elongation at Break, % | 510 | 540 |
| 300% Modulus, psi | 1180 | 925 |
| Wt. Swelling Ratio, Q* | 3.1 | 3.4 |
| Percent solubility, | 3.5 | 10.0 |

|                                                                                | Terpolymer prepared with hexamethylphosphoric triamide modification | Terpolymer prepared without modification (Control) |
| --- | --- | --- |
| toluene |  |  |

*Grams of toluene per gram of rubber gel. Qualitatively, the higher the value of Q the lower is the crosslink density.

The data on crosslink density (300% modulus and swelling ratio) and percent solubility show that the polymer obtained with the modified catalyst on vulcanization gave higher crosslink density than the control polymer. Tensile strength of the vulcanizate of the polymer resulting from the modified catalyst was also superior to that of the control sample. These data show that modification of the polymerization catalyst with hexamethylphosphoric triamide produced a higher molecular weight, gel-free rubber which gives superior vulcanizate properties than those obtainable in the control experiment.

EXAMPLE III

A solution of 81.5 grams (0.966 mole) 1-hexene and 5.61 grams (0.0509 mole) 1,7-octadiene (molar charge ratio 95:5) in 560 ml pentane was polymerized with the required amount of Et$_2$AlCl, hexamethylphosphoric triamide and δ-TiCl$_3$ (4.0 millimoles δ-TiCl$_3$) at 25° C. for 21 hours. The molar ratio of hexamethylphosphoric triamide to Et$_2$AlCl was 0.7:1 and of Et$_2$AlCl to TiCl$_3$ was 4.0:1. The conversion to copolymer was 75 percent, inherent viscosity was 2.3, and there was no gel. A copolymer prepared similarly at a molar ratio of Et$_2$AlCl to TiCl$_3$ of 1.5:1 and of phosphoric triamide to Et$_2$AlCl of 0.7:1 was obtained in 72 percent conversion, with inherent viscosity of 2.9 and zero gel content.

EXAMPLE IV

A solution of 54 grams (0.64 mole) 1-hexene and 7.9 grams (0.072 mole) 1,7-octadiene (molar charge ratio 90:10) in 80 ml pentane was polymerized with the required amount of Et$_2$AlCl/hexamethylphosphoric triamide/δ-TiCl$_3$ catalyst (2.4 millimoles δ-TiCl$_3$). The molar ratio of hexamethylphosphoric triamide to Et$_2$AlCl was 0.7:1 and of Et$_2$AlCl to TiCl$_3$ was 1.5:1. After agitating for 24 hours at 25° C., the resulting copolymer was isolated by methanol coagulation and dried. The conversion to copolymer was 83 percent, inherent viscosity 3.5 and percent gel=0. A copolymer prepared similarly but without hexamethylphosphoric triamide was obtained in 95 percent conversion. It had inherent viscosity of 1.1 and 78 percent gel. These data show the remarkable ability of the modified catalyst to suppress gel formation during polymerization while producing a higher molecular weight copolymer.

EXAMPLE V

A solution of 54 grams (0.64 mole) 1-hexene and 7.9 grams (0.072 mole) 1,7-octadiene (molar charge ratio 90:10) in 80 ml pentane was polymerized as in Example I with EtAlCl$_2$/hexamethylphosphoric triamide/δ-TiCl$_3$ catalyst (2.4 millimoles δ-TiCl$_3$). The molar ratio of EtAlCl$_2$ to TiCl$_3$ was 1.5:1 and of the phosphoramide to EtAlCl$_2$ was 0.7:1. The resulting copolymer was obtained in 91 percent conversion, with inherent viscosity of 4.1 and zero percent gel.

EXAMPLE VI

A solution of 54 grams (0.64 mole) 1-hexene and 23.6 grams (0.215 mole) 1,7-octadiene (molar charge ratio 75:25) in 80 ml pentane was polymerized with Et$_2$AlCl/hexamethylphosphoric triamide/δ-TiCl$_3$ catalyst (2.4 millimoles δ-TiCl$_3$). The molar ratio of Et$_2$AlCl to δ-TiCl$_3$ was 1.5:1 and of the phosphoramide to Et$_2$AlCl was 0.7:1. The resulting copolymer was obtained in 47 percent conversion, with an inherent viscosity of 3.6, and only three percent gel. Reference to Example IV would suggest that the unmodified catalyst would have produced copolymer containing more than 78 percent gel.

EXAMPLE VII

A solution of 54 grams (0.64 mole) 1-hexene and 3.8 grams (0.034 mole) 1,7-octadiene (molar charge ratio 95:5) in 80 ml pentane was polymerized with Et$_2$AlCl/triethylphosphate/δ-TiCl$_3$ catalyst (1.0 millimole δ-TiCl$_3$). The molar ratio of Et$_2$AlCl to δ-TiCl$_3$ was 1.5:1 and of triethylphosphate to Et$_2$AlCl was 0.7:1. After agitation for 24 hours at 25° C., the resulting copolymer was isolated by methanol coagulation and dried. The conversion to copolymer was 74 percent, with an inherent viscosity of 5.1 and zero percent gel. A copolymer prepared similarly but without triethylphosphate was obtained in 84 percent conversion. It had an inherent viscosity of 4.8 and 20 percent gel. These data show that triethylphosphate, like hexamethylphosphoric triamide, suppresses gel formation during polymerization.

EXAMPLE VIII

A solution of 54 grams (0.64 mole) 1-hexene and 3.8 grams (0.034 mole) 1,7-octadiene (molar charge ratio 95:5) in 80 ml pentane was polymerized with Et$_2$AlCl/tri-n-butyl phosphate/δ-TiCl$_3$ catalyst (1.0 millimole δ-TiCl$_3$). The molar ratio of Et$_2$AlCl to TiCl$_3$ was 1.5:1 and of phosphate to Et$_2$AlCl was 0.7:1. The resulting copolymer was obtained in 82 percent conversion, with an inherent viscosity of 5.0 and zero percent gel. A copolymer prepared similarly but without tri-n-butyl phosphate modification had an inherent viscosity of 4.8 and 20 percent gel.

EXAMPLE IX

A solution of 54 grams (0.64 mole) 1-hexene and 6.6 grams (0.034 mole) 1,13-tetradecadiene (molar charge ratio 95:5) in 80 ml benzene was polymerized with Et$_2$AlCl/hexamethylphosphoric triamide/δ-TiCl$_3$ catalyst (1.7 millimoles δ-TiCl$_3$) at 25° C. for 24 hours. The molar ratio of Et$_2$AlCl to TiCl$_3$ was 1.5:1 and of the phosphoric triamide to Et$_2$AlCl was 1.1:1. The copolymer conversion was 92 percent, with an inherent viscosity of 5.7, two percent gel, and an unsaturation value of 0.24 mole/kg as measured by the iodine monochloride method. A copolymer prepared similarly with Et$_2$AlCl and δ-TiCl$_3$ catalyst (0.6 millimole TiCl$_3$), but without hexamethylphosphoric triamide, had an inherent viscosity of 2.5 and 90 percent gel. It was obtained in 78 percent conversion. These data demonstrate the dramatic effect of the triamide modified catalyst in essentially eliminating gel during the copolymerization of hexene and 1,13-tetradecadiene.

EXAMPLE X

A premix of 1033 grams (18.4 moles) 1-butene, 1042 grams (12.4 moles) 1-hexene, and 296 grams (2.68 moles) 1,7-octadiene (molar charge ratio 55:37:8) in 9480 grams n-heptane was polymerized with $Et_2AlCl$-/hexamethylphosphoric triamide/$\delta$-$TiCl_3$ catalyst (0.125 mole $\delta$-$TiCl_3$) for 22 hours at 30° C. The molar ratio of $Et_2AlCl$ to $TiCl_3$ was 1.5:1 and of phosphoric triamide to $Et_2AlCl$ was 0.3:1. The conversion to terpolymer was 56 percent, with an inherent viscosity of 2.8, zero percent gel (chloroform) and an unsaturation value of 0.35 mole/kg.

EXAMPLE XI

Individual aliquots, each containing a solution of 54 grams (0.64 mole) 1-hexene and 3.8 grams (0.034 mole) 1,7-octadiene (molar charge ratio 95:5) in 80 ml pentane were polymerized according to the procedure in Example I with each of the five different catalysts shown below as A to E:
A. 1.50 millimoles $Et_2AlCl$ and 1.00 millimoles $\delta$-$TiCl_3$.
B. 1.50 millimoles $Et_2AlCl$, 1.00 millimole $\delta$-$TiCl_3$, and 0.60 millimole triethyl phosphite.
C. 1.50 millimoles $Et_2AlCl$, 1.00 millimole $\delta$-$TiCl_3$, and 1.05 millimoles triethyl phosphite.
D. 1.50 millimoles $Et_2AlCl$, 1.00 millimole $\delta$-$TiCl_3$, and 1.05 millimoles tri-n-butyl amine.
E. 1.50 millimoles $Et_2AlCl$, 1.00 millimole $\delta$-$TiCl_3$, and 1.05 millimoles hexamethylphosphoric triamide.

| Catalyst | Additive | Copolymer Conversion, % | Inherent Viscosity* | Percent Gel* |
|---|---|---|---|---|
| A | None | 84 | 4.8 | 17 |
| B | Triethylphosphite | 40 | 7.4 | 21 |
| C | Triethylphosphite | 11 | ND** | ND** |
| D | Tri-n-butylamine | 74 | 4.9 | 21 |
| E | Hexamethylphosphoric triamide | 64 | 4.5 | 0 |

*Toluene solvent, 30° C.
**Not Determined.

These data demonstrate that triethyl phosphite and tri-n-butylamine modifiers were ineffective in reducing the gel. Only hexamethylphosphoric triamide gave copolymer free from gel. Hence, it appears that it cannot be predicted which modifier will give low gels with this system.

In another experiment, a solution of 54 grams (0.64 mole) 1-hexene and 3.8 grams (0.034 mole), 1,7-octadiene (molar charge ratio 95:5) in 80 ml benzene was polymerized with $Et_2AlCl$/$\delta$-$TiCl_3$ catalyst (1.0 millimole $\delta$-$TiCl_3$). The molar ratio of $Et_2AlCl$ to $\delta$-$TiCl$ was 1.5:1. The resulting copolymer was obtained in 82 percent conversion, with an inherent viscosity of 5.3 and 49 percent gel, thus indicating the ineffectiveness of $\alpha$-picoline in reducing gel during copolymerization of this system.

EXAMPLE XII

A solution of 875 grams (10.4 moles) 1-hexene and 61.5 grams (0.56 mole) 1,7-octadiene (molar charge ratio 95:5) in 1300 ml n-pentane was polymerized with $Et_2AlCl$/hexamethylphosphoric triamide/$\delta$-$TiCl_3$ catalyst (10 millimoles $\delta$-$TiCl_3$) for 48 hours at 25° C. The molar ratio of $Et_2AlCl$ to $TiCl_3$ was 1.5:1 and of the phosphoric triamide to $Et_2AlCl$ was 0.7:1. The conversion to copolymer was 52 percent, with an inherent viscosity of 6.3, zero percent gel, and an unsaturation value of 0.57 mole/kg as measured by the iodine monochloride method. Similarly, a solution of 54 grams (0.64 mole) 1-hexene and 2.8 grams (0.034 mole) 1,5-hexadiene (molar charge ratio 95:5) in 80 ml pentane was polymerized with $Et_2AlCl$/hexamethylphosphoric triamide/$\delta$-$TiCl_3$ catalyst (1.6 millimoles $\delta$-$TiCl_3$) for 24 hours at 25° C. The molar ratio of $Et_2AlCl$ to $TiCl_3$ was 1.5:1 and of the phosphoric triamide to $Et_2AlCl$ was 0.6:1. The conversion to copolymer was 51 percent with an unsaturation value of 0.08 mole/kg. The unsaturation data demonstrate the dramatic difference between 1,7-octadiene and 1,5-hexadiene during copolymerization with 1-hexene with the hexamethylphosphoric triamide modified catalyst. With 1,5-hexadiene there is a dramatic loss of unsaturation, presumably because of the formation of saturated cyclic units.

EXAMPLE XIII

A solution of 54 grams (0.64 mole) 1-hexene and 3.8 grams (0.034 mole) 1,7-octadiene (molar charge ratio 95:5) in 80 ml pentane was polymerized with $Et_2AlCl$-/hexamethylphosphoric triamide/$\delta$-$TiCl_3$ catalyst (1.0 millimole $\delta$-$TiCl_3$). The molar ratio of $Et_2AlCl$ to $\delta$-$TiCl_3$ was 1.5:1 and of phosphoramide to $Et_2AlCl$ was 0.7:1. The resulting copolymer (A) was obtained in 78 percent conversion, with an inherent viscosity of 5.1, and zero percent gel. A copolymer (B) prepared similarly but with tri-n-butyl phosphate in place of hexamethylphosphoric triamide was obtained in 82 percent conversion with inherent viscosity of 5.0 and zero percent gel. In another experiment, a solution of 54 grams (0.64 mole) 1-hexene and 7.9 grams (0.072 mole) 1,7-octadiene (molar charge ratio 90:10) in 80 ml pentane was polymerized with $Et_2AlCl$/hexamethylphosphoric triamide/$\delta$-$TiCl_3$ catalyst (2.4 millimoles $\delta$-$TiCl_3$). The molar ratio of $Et_2AlCl$ to $\delta$-$TiCl_3$ was 1.5:1. The resulting copolymer (C) was obtained in 80 percent conversion with an inherent viscosity of 3.5 and zero percent gel.

The rubbery copolymers were compounded with the compounding recipe of Example II. Vulcanizates were prepared by curing the compounded rubbers in a press for 15 minutes at 310° F. Some properties of the vulcanizates are given below:

| | Copolymer | | |
|---|---|---|---|
| | A | B | C |
| Tensile strength, psi | 2340 | 2170 | 2200 |
| Elongation at Break, % | 505 | 470 | 510 |
| 300% Modulus, psi | 1180 | 1290 | 1150 |
| Wt. Swelling Ratio, Q* | 2.9 | 2.9 | 3.0 |
| Percent Solubility, Toluene | 4.0 | 5.0 | 5.0 |

*Grams of toluene per gram of rubber gel. Qualitatively, the higher the value of Q, the lower is the crosslink density.

The data on crosslink density (300% modulus and swelling ratio) show that all three copolymers on vulcanization gave high crosslink density.

Thus, the invention is directed to an improved process for preparing sulfur vulcanizable unsaturated interpolymers of enhanced inherent viscosity and unsaturation and essentially free of gel and which give vulcanizates having improved stress-strain properties. This process comprises reacting at least one terminally unsaturated monoolefin selected from the group consisting of $\alpha$-olefins containing 4 to 12 carbon atoms with at least one nonconjugated diene of the $\alpha,\omega$-type.

Thus, the invention produces a composition of matter consisting of low-gel, i.e. zero to about 5 percent, high molecular weight as indicated by the inherent viscosity, and improved unsaturation interpolymers of α-olefins containing 4 to 12 carbon atoms with α,ω-dienes containing at least 8 carbon atoms, such interpolymers on subsequent curing yielding vulcanizates having improved physical properties.

Therefore, this invention is related to a new composition of matter comprising interpolymers prepared from 95 to 75 mole percent of at least one α-olefin containing from 4 to 12 carbon atoms and 5 to 25 mole percent of at least one α,ω-diene containing at least 8 carbon atoms in the presence of coordination catalysts prepared from Components (A) an organoaluminum compound, (B) a transition metal compound selected from Group IVB of the Periodic Table, and (C) at least one compound of the general formula: $Q=P(XY_n)_3$ wherein Q is oxygen or sulfur, P is phosphorous, Y is a hydrocarbyl radical containing from 1 to about 20 carbon atoms and X is oxygen, sulfur, or nitrogen and n is an integer having values of 1 or 2, with the proviso that when X is oxygen or sulfur, then n is 1 and when X is nitrogen, then n is 2, said interpolymers having improved unsaturation, from 0 to 5 percent gel, and greater inherent viscosities than those of the corresponding interpolymers obtained with a coordination catalyst prepared from said Component (A) an organolauminum compound and said Component (B) a transition metal compound selected from Group IVB of the Periodic Table.

This invention is also related to new vulcanizates of sulfur-vulcanizable interpolymers having improved properties including tensile strength greater than 2000 psi, elongation at break in the range of 400 to 650 percent, and crosslink density as measured by swelling ratio value, Q, of less than 4.0, said interpolymers being obtained by copolymerization of from 95 to 75 mole percent of at least one α-olefin containing from 4 to 12 carbon atoms and 5 to 25 mole percent of at least one α,ω-diene containing at least 8 carbon atoms in the presence of a coordination catalyst prepared from Components (A) an organoaluminum compound, (B) a transition metal compound selected from Group IVB of the Periodic Table and (C) at least one compound of the general formula: $Q=P(XY_n)_3$ wherein Q is oxygen or sulfur, P is phosphorous, Y is a hydrocarbon radical containing from 1 to 20 carbon atoms, and X is oxygen, sulfur or nitrogen, and n is an integer having values of 1 or 2, with the proviso that when X is oxygen or sulfur, then n is 1 and when X is nitrogen, then n is 2.

While certain representative embodiments and details have been shown for the purpose of illustrating the invention, it will be apparent to those skilled in this art that various changes and modifications may be made therein without departing from the spirit or scope of the invention.

What is claimed is:

1. Vulcanizates of sulfur-vulcanizable interpolymers having improved properties including tensile strength greater than 2000 psi, elongation at break in the range of 400 to 650%, and crosslink density was measured by swelling ratio value, Q of less than 4.0, said interpolymers being obtained by copolymerization of from 95 to 75 mole percent of at least one α-olefin containing from 4 to 12 carbon atoms and 5 to 25 mole percent of at least one α,ω-diene containing at least 8 carbon atoms in the presence of a coordination catalyst prepared from Components (A) an organoaluminum compound, (B) a transition metal compound selected from Group IVB of the Periodic Table, and (C) at least one compound of the general formula: $Q=P(XY_n)_3$ wherein Q is oxygen or sulfur, P is phosphorous, Y is a hydrocarbyl radical containing from 1 to 20 carbon atoms, and X is oxygen, sulfur or nitrogen, and n is an integer having values of 1 or 2, with the proviso that when X is oxygen or sulfur, then n is 1 and when X is nitrogen, then n is 2.

2. The vulcanizates of interpolymers of α-olefins and α,ω-dienes according to claim 1 wherein the α-olefin is chosen from the group consisting of 1-butene, 1-pentene, 1-hexene, 1-heptene, 1-octene, 1-nonene, 1-decene, 1-undecene, and 1-dodecene and the α,ω-diene is chosen from the group consisting of 1,7-octadiene, 1,9-decadiene, 1,11-dodecadiene, and 1,13-tetradecadiene.

3. The vulcanizates of interpolymers of α-olefins and α,ω-dienes according to claim 1 wherein the Component (C) of the coordination catalyst is selected from the group consisting of hexamethylphosphoric triamide, hexaethylphosphoric triamide, hexamethylthiophosphoric triamide, triethylphosphate, tri-n-butyl phosphate, and S,S,S-trimethylphosphorotrithioate.

4. The vulcanizates of interpolymers of α-olefins and α,ω-dienes according to claim 1 wherein the molar ratio of Component (A) to Component (B) of the coordination catalyst is 0.5 to 15 and the molar ratio of Component (C) to Component (A) is 0.1 to 2.

5. The vulcanizates of interpolymers of α-olefins and α,ω-dienes according to claim 1 wherein the α,ω-diene is 1,7-octadiene, Component (B) of the coordination catalyst is titanium trichloride, and Component (C) is hexamethylphosphoric triamide.

6. The vulcanizates of interpolymers of α-olefins and α, ω-dienes according to claim 1 wherein the α,ω-diene is 1,7-octadiene, Component (B) of the coordination catalyst is titanium trichloride, and Component (C) is selected from the class consisting of triethyl phosphate, tri-n-butyl phosphate, and S,S,S-trimethyl phosphorotrithioate.

7. The vulcanizates of interpolymers of α-olefins and α,ω-dienes according to claim 1 wherein Component (B) of the coordination catalyst is titanium trichloride.

* * * * *